Patented Jan. 16, 1945

2,367,312

UNITED STATES PATENT OFFICE 2,367,312

STABLE FURFURALDEHYDE-FURFUR-ALCOHOL COMPOSITIONS

Edward A. Reineck, Appleton, Wis., assignor, by mesne assignments, to Kewaunee Manufacturing Company, Adrian, Mich., a corporation of Michigan No Drawing. Application April 9, 1942, Serial No. 438,215

3 Claims. (Cl. 260—67)

The present invention relates to stable compositions for use in the resin art, and more particularly to stabilized furfuralcohol-furfuraldehyde compositions.

The resinification of furfuraldehyde and furfuralcohol or a mixture of such furans by addition of acid substances is well known in the art. Although resins of this type have improved properties of the type desired, their use has been limited due to the characteristic instability of the resin forming mixture prior to desired resinification. Many attempts have been made to stabilize the furan mixtures and control the speed of reaction (condensation) in order to safely and economically utilize the resinous products formed by this reaction. An example of a previous suggestion is the use of relatively expensive organic solvents such as ethylene glycol, monoethyl ether, methyl isobutyl ketone, etc. with a preliminary or partially condensed furan condensation product.

Up to the time of the present invention no satisfactory mixture containing all of the ingredients including the acid catalyst has been available to the art. Prior compositions, for example, could not be safely stored for relatively long periods of time due to premature resinification and resulting precipitation of insoluble resin. Tests have shown such compositions to "gel" on standing and to be unfit in this condition for coating or molding purposes. It was due to this that compositions available heretofore were stored without or with only a small portion of the catalyst and were mixed up in final form just prior to use. The disadvantages of such a procedure which required the compounding of fresh mixtures for each job, discarding the mixture left over, etc. are apparent.

The principal object of the present invention is to provide stable furan compositions which are ready for commercial application and do not require further compounding or mixing prior to use.

Another object of the present invention is to provide stable furan compositions which may be stored without danger of premature resinification.

Other objects of the present invention will be apparent as the detailed description proceeds.

I have discovered that furans containing the catalyst, and preferably catalyzed mixtures made up of about 40-90% furfuraldehyde and 10-60% furfuralcohol, may be satisfactorily stabilized by addition of water. The water used should be sufficient to saturate the furan but should not be present in excess. An excess of water above that which is taken up by the furan or furan mixture rises to the surface resulting in a heterogeneous mixture or solution which does not possess the essential characteristics for various applications.

My investigations have shown that at 75° F. a 2000 cc. furan mixture containing 10% alcohol (i. e. 1800 cc. furfuraldehyde and 200 cc. furfuralcohol) will dissolve or tolerate 150 cc. of water. My investigations have also shown under these conditions that the furan mixture will dissolve about 5 cc. additional water for each per cent (i. e. 1.0%) increase in furfuralcohol. For example, a furan mixture containing 50% alcohol (i. e. 1000 cc. furfuraldehyde and 1000 cc. furfuralcohol at 75° F.) will dissolve (due to the 40% increase in furfuralcohol) 200 cc. more of water or take up a total of 350 cc. of water. The following are additional illustrative examples.

|  | Percent |
|---|---|
| (a) 1700 cc. furfuraldehyde | 85 |
| 300 cc. furfuralcohol | 15 |
| 175 cc. water | |
| (b) 1600 cc. furfuraldehyde | 80 |
| 400 cc. furfuralcohol | 20 |
| 200 cc. water | |
| (c) 1500 cc. furfuraldehyde | 75 |
| 500 cc. furfuralcohol | 25 |
| 225 cc. water | |
| (d) 1400 cc. furfuraldehyde | 70 |
| 600 cc. furfuralcohol | 30 |
| 250 cc. water | |
| (e) 1200 cc. furfuraldehyde | 60 |
| 800 cc. furfuralcohol | 40 |
| 300 cc. water | |

The preferred range is 60-80% furfuraldehyde and 20-40% furfuralcohol, while the preferred composition is shown in example (c) above. The water in the final composition should make up about 5 to 20% by volume based on the furan ingredients, the water percentage increasing as the per cent of furfuralcohol is increased. The water as previously indicated should not be present in excess as the resulting mixture in such case is unsatisfactory as it is heterogeneous in character.

The above mixtures, in addition to the furan ingredients and water, contain the desired amount of catalyst. Experience has shown that the best results are obtainable when the 2000 cc. mixtures contain about one per cent by weight based on furan ingredients (e. g. 20 grams) of concentrated mineral acid such as $H_2SO_4$ or HCl. Ordinarily about 0.1% to 6.0% catalyst should be used, and in any event sufficient catalyst should be present to provide for proper condensation or resinification under the conditions of operation. In the above examples the volumes of water specified include the total volume of water plus acid.

The mixtures of the present invention are stable when the water is retained therein and are free from premature gelling or resinifying when stored at room temperatures. They may be prepared in final form before use and their unique stability makes it unnecessary to prepare small batches for immediate use or consumption. Mixtures left over from one application need not be discarded but may be stored so as to keep the water content constant and may be used in later work.

The compositions of the present invention may be used in spraying compositions and may also be used as a resin or binder with wood flour fillers, with cotton flock, or with thermoplastic products of the type of thermoplastic redwood pulp, or may be used to extend phenol-formaldehyde resins in conventional type molding powders or as an extender in many other thermoplastic and thermosetting compositions. The compositions of the present invention have been found particularly adaptable for use with the modified tannin wood (e. g. redwood) molding compositions described in the co-pending applications of Harry F. Lewis, Serial Nos. 345,106 and 403,254. The combination of the stabilized compositions of the present invention with the Lewis exploded redwood, for example, gives a mixture with improved molding characteristics and a final modified product of the type desired for many applications.

The following example will serve to illustrate a use of the composition of the present invention.

| | Pounds |
|---|---|
| Furfuraldehyde | 9 |
| Furfuralcohol | 3 |
| Water containing about 54 grams of concentrated $H_2SO_4$ | 1.2 |

The above ingredients are mixed together and stirred until the resulting solution or dispersion is homogeneous. The resulting composition, which may be stored before use, if desired, may be mixed (e. g. in a concrete mixer) with about 100–110 pounds of pulverized (30–80 mesh) filler such as clay, silica, slate, talc, etc. The resulting mixture may then be molded by vibration (tamping or vibrating mold) or molded under pressure with or without use of heat. The molded composition sets and hardens as the water evaporates, the resinification taking place more rapidly under heat, e. g. 60°–200° C. The resulting bonded composition exhibits great physical strength and toughness, etc. Softeners and plasticizers may be incorporated to achieve certain specific effects as desired.

It will be understood that the present invention is not limited to the above illustrative example. Various modifications of the present invention are intended to be covered by the following claims.

I claim:

1. In the resin art, a homogeneous mass consisting essentially of furfuraldehyde and furfuralcohol; said mass containing sufficient acid catalyst to effect polymerization when the mass is heated; said catalyst being a strong mineral acid and amounting to from about 0.1% to about 6.0% of the weight of the furan ingredients; said mass containing substantially as much water as it will absorb into homogeneous solution without separation of supernatant liquid; said water by volume amounting to approximately 11.25% of the furans present, when the alcohol is 25% of the total furans, plus about 0.25% for each additional 1% of alcohol and minus about 0.25% for each 1% reduction in the proportion of alcohol; said mass being unaffected by storage at room temperature over long periods of time; the furfuralcohol being from 10% to 60% of the total mass of furans; said mass being relatively unpolymerized but being susceptible of complete polymerization by the application of heat and pressure without the addition of any further ingredients.

2. In the resin art, a homogeneous mass consisting essentially of furfuraldehyde and furfuralcohol; said mass containing sufficient acid catalyst to effect polymerization when the mass is heated; said catalyst being a strong mineral acid and amounting to about 1.0% of the weight of the furan ingredients; said mass containing substantially as much water as it will absorb into homogeneous solution without separation of supernatant liquid; said water by volume amounting to approximately 11.25% of the furans present, when the alcohol is 25% of the total furans, plus about 0.25% for each additional 1% of alcohol and minus about 0.25% for each 1% reduction in the proportion of alcohol; said mass being unaffected by storage at room temperature over long periods of time; the furfuralcohol being from 20% to 40% of the total mass of furans; said mass being relatively unpolymerized but being susceptible of complete polymerization by the application of heat and pressure without the addition of any further ingredients.

3. In the resin art, a homogeneous mass consisting essentially of furfuraldehyde and furfuralcohol; said mass containing sufficient acid catalyst to effect polymerization when the mass is heated; said catalyst being a strong mineral acid and amounting to about 1.0% of the weight of the furan ingredients; said mass containing substantially as much water as it will absorb into homogeneous solution without separation of supernatant liquid; said water by volume amounting to approximately 11.25% of the furans present; said mass being unaffected by storage at room temperature over long periods of time; the furfuralcohol being about 25% of the total mass of furans; said mass being relatively unpolymerized but being susceptible of complete polymerization by the application of heat and pressure without the addition of any further ingredients.

EDWARD A. REINECK.